(12) United States Patent
Cotto-Rodriguez

(10) Patent No.: US 8,629,571 B2
(45) Date of Patent: Jan. 14, 2014

(54) POWER GENERATION HYDRAULIC SYSTEM

(76) Inventor: Carlos Javier Cotto-Rodriguez, Cayey, PR (US)

( * ) Notice: Subject to any disclaimer, the term of this patent is extended or adjusted under 35 U.S.C. 154(b) by 458 days.

(21) Appl. No.: 12/416,962

(22) Filed: Apr. 2, 2009

(65) Prior Publication Data

US 2010/0253082 A1    Oct. 7, 2010

(51) Int. Cl.
*F03B 13/10* (2006.01)

(52) U.S. Cl.
USPC .................................. 290/53; 290/54; 60/398

(58) Field of Classification Search
USPC ..................... 290/42–43, 53–54; 60/495–502; 417/330–333; 415/7
See application file for complete search history.

(56) References Cited

U.S. PATENT DOCUMENTS

| | | | | |
|---|---|---|---|---|
| 4,398,095 A * | 8/1983 | Ono | ................................. | 290/53 |
| 4,622,812 A * | 11/1986 | Thompson et al. | ............. | 60/398 |
| 6,009,707 A * | 1/2000 | Alkhamis | ........................ | 60/398 |
| 6,388,342 B1 * | 5/2002 | Vetterick et al. | ................ | 290/53 |
| 2009/0250934 A1 * | 10/2009 | Bozano | ............................ | 290/53 |
| 2010/0219639 A1 * | 9/2010 | Thompson, Jr. | ................ | 290/53 |

* cited by examiner

*Primary Examiner* — Michael Zarroli
(74) *Attorney, Agent, or Firm* — Ferraiuoli LLC; Eugenio J. Torres-Oyola; Rafael Rodriguez-Muriel

(57) ABSTRACT

A power generation system 1 comprising a first water container, a hydropower system, a second water container and a pump system. The hydropower system 2,3,4 harness water energy coming from the first container and directed it to the second container. The water at the second container circulates to the first container by the pump system located at the second water container. The pump system is energized or powered by an external source and energy generated from the water displacement due to gravity at said pump.

5 Claims, 11 Drawing Sheets

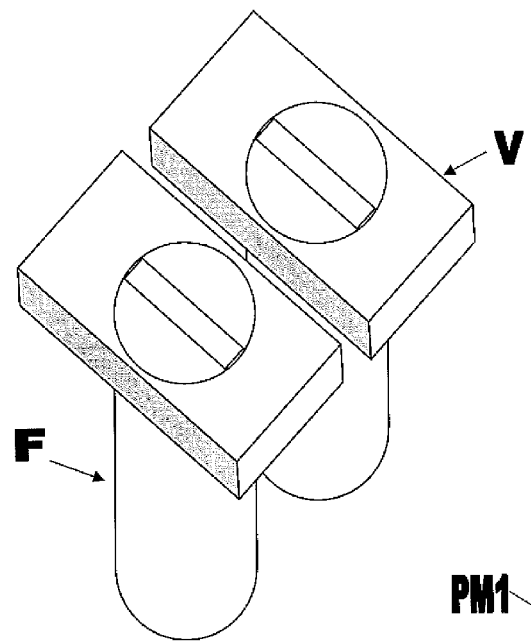
FIG. 8
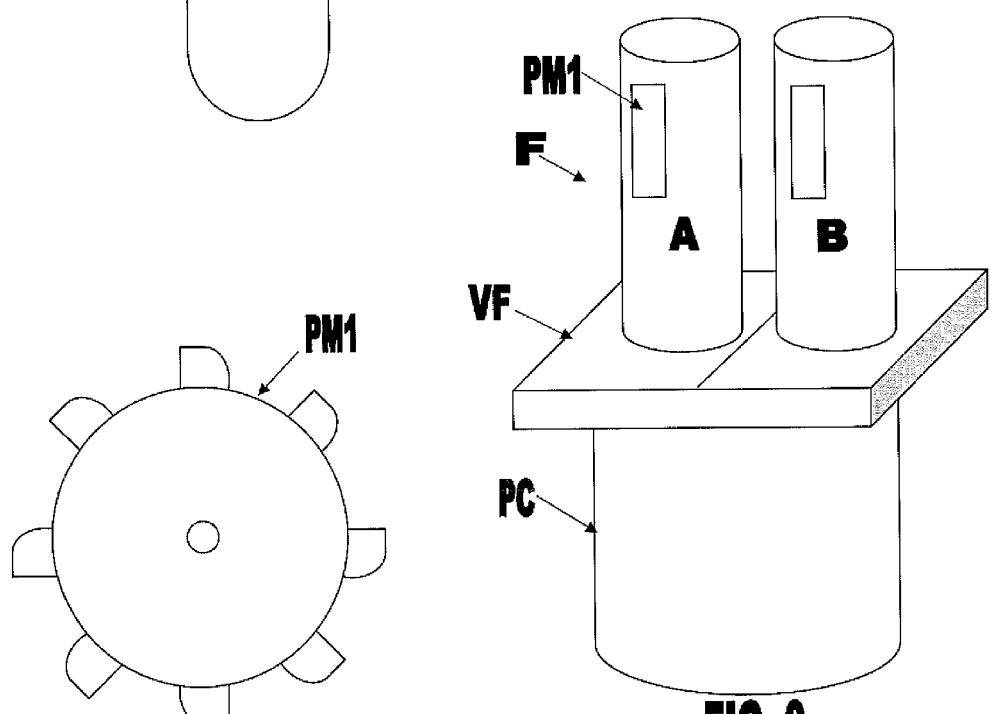
FIG. 7
FIG. 9

POWER GENERATION HYDRAULIC SYSTEM

STATEMENT REGARDING FEDERALLY SPONSORED RESEARCH AND DEVELOPMENT

N/A

RELATED APPLICATIONS

N/A

BACKGROUND OF THE INVENTION

1. Field of the Invention

The invention is related to a power generation system comprising a hydraulic system, more particularly to an electric generation system comprising hydropower system which uses gravity force or water weight as the prime mover source for electrical current production and pump system that circulates the efficiently the water. The pump system is meant to be powered by renewable energy for starting the system in order to maintain a continuous flow of water for the hydropower system to produce electric current.

2. Discussion of the Background

Currently the rising of the oil and the global warming due to pollution makes people be more concerned about the environment and at the same time motivates people to look for ways to protect it such as alternative sources f energy. On the search for producing alternatives source of energy, renewable energy has been consider. The main reason of using renewable energy such as hydroelectric energy source is to avoid or reduce contamination to our environment. Therefore the production of electrical power through hydropower systems assists to resolve the energetic crisis we are going through worldwide.

Hydroelectric plants production of power is through use of the gravitational force of falling or flowing water. Therefore this type of alternative energy is low environmental impact. Most of the hydropower system use the drop of water and then release that water to the environment avoiding the recycling of the water. Therefore there is a need of a system that circulates water efficiently.

The present invention provides electric energy generation system comprising a hydropower system and a pump system, wherein said pump system is powered by renewable energy in order to generate electric power while maintaining a water flow in a controlled environment. The system is design to utilized water to produce electric energy and returned it to its origin place after interacting with the hydraulic system and with out environmental contamination.

SUMMARY OF THE INVENTION

The present invention overcomes the disadvantages of the Prior Art by providing a power generation system using renewable energy for the generation of electrical power comprising a first water container mechanically connected to a hydraulic power or hydropower system wherein said hydropower system uses the gravitational force of falling or flowing water from said container and drops into a second bigger container, such as a lake, wherein the water receiving at the second container is pumped to the first water container using a pump system energized by renewal energy including energy generated from the water displacement due to gravity at said pump.

Another object of the invention is to reduce the no-renewable energy consumption.

Another object of the invention is to provide a high efficient renewable energy system.

Yet another object of the present invention is to provide a pump system that efficiently circulates water at the power generation.

The invention itself, both as to its configuration and its mode of operation will be best understood, and additional objects and advantages thereof will become apparent, by the following detailed description of a preferred embodiment taken in conjunction with the accompanying drawing.

The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying drawings which are incorporated herein constitute part of the specifications and illustrate the preferred embodiment of the invention.

FIG. 7. is a view of the pump system valve.

FIG. 8 is an isometric view of the piston cylinder of the pump system.

FIG. 9 is a view of a piston cylinder water exit.

DESCRIPTION OF THE PREFERRED EMBODIMENT

Figure 1:
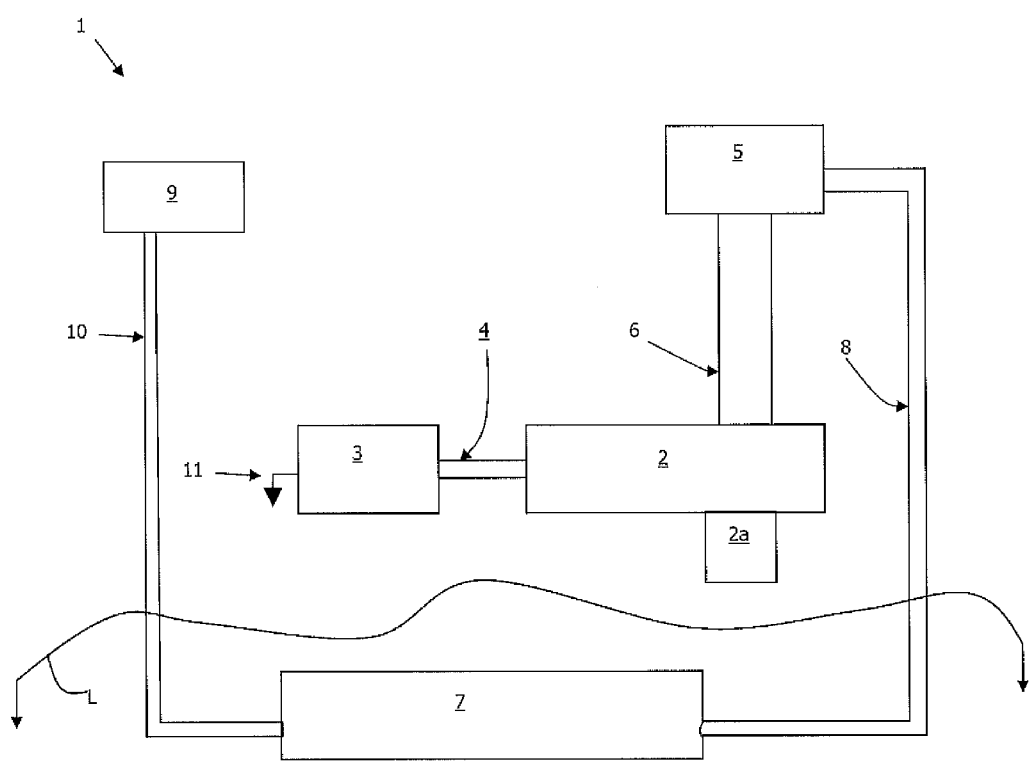
FIG. 1 shows a general structure of the power system present invention.

The present invention is directed to a power generation system 1 using renewable energy efficiently. FIG. 1 show a general structure of the present invention wherein a power generation system 1 comprising a first water container 5, a hydropower system 2,3,4 comprising a prime mover 2 mechanically coupled to a generator 3 through mechanical means, such as gears 4 or shaft. The hydropower system 2,3,4 harness water energy coming from intake 6, such as a pipeline, wherein said intake 6 leads the water from the first storage container 5 to said hydropower system 2,3,4. After the water interacts with the hydropower system 2,3,4 is leaded to a second water container L, such as a lake, through an outtake 2a. Further a pump system 7 located at the second water container L circulate the water toward the first water container 5. The pump system 7 is energized or powered by an external source, such as solar panels, wherein a transmission line, such as electrical connections, connected between the pump and the external source 9 supplies external renewable energy.

Figure 2:
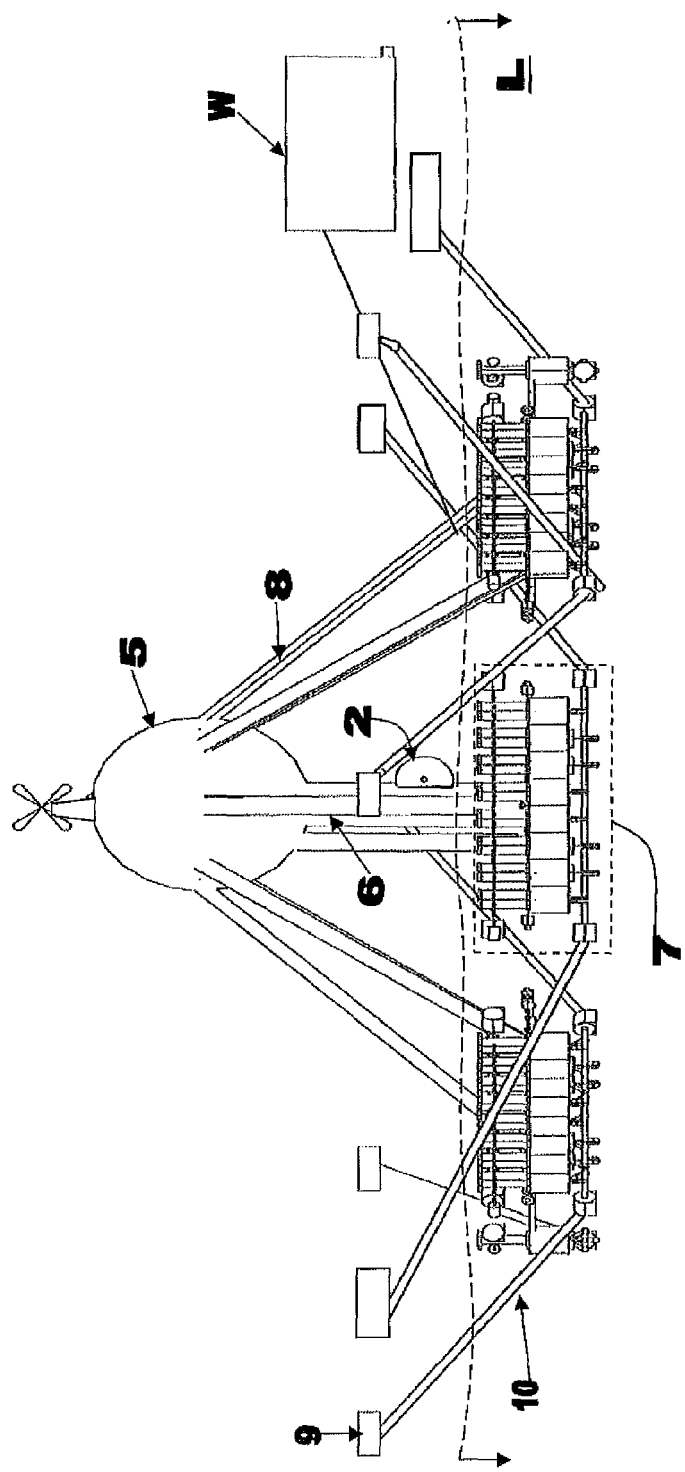
FIG. 2 is a view of the present invention power system.

FIG. 2 shows a first embodiment of the current invention. A first water container 5 connected to a prime mover 2 through a pipe or intake 6, wherein said first container 5 is shifted away from said prime mover 2 in such way that the water at the first container 5 moves toward the prime mover 2 trough the feeding system and produces the necessary motion at the prime mover to generate the reciprocal or rotational motion at the generator 3 in order to produce electrical energy. After providing the motion at the hydropower system 2 the system is provided with at least an outtake 2a to deliver or direct the water to a second container 7. At said second water container L a pump system 7 is submerged in order to circulate or pump water toward the first water container 5.

Figure 3:
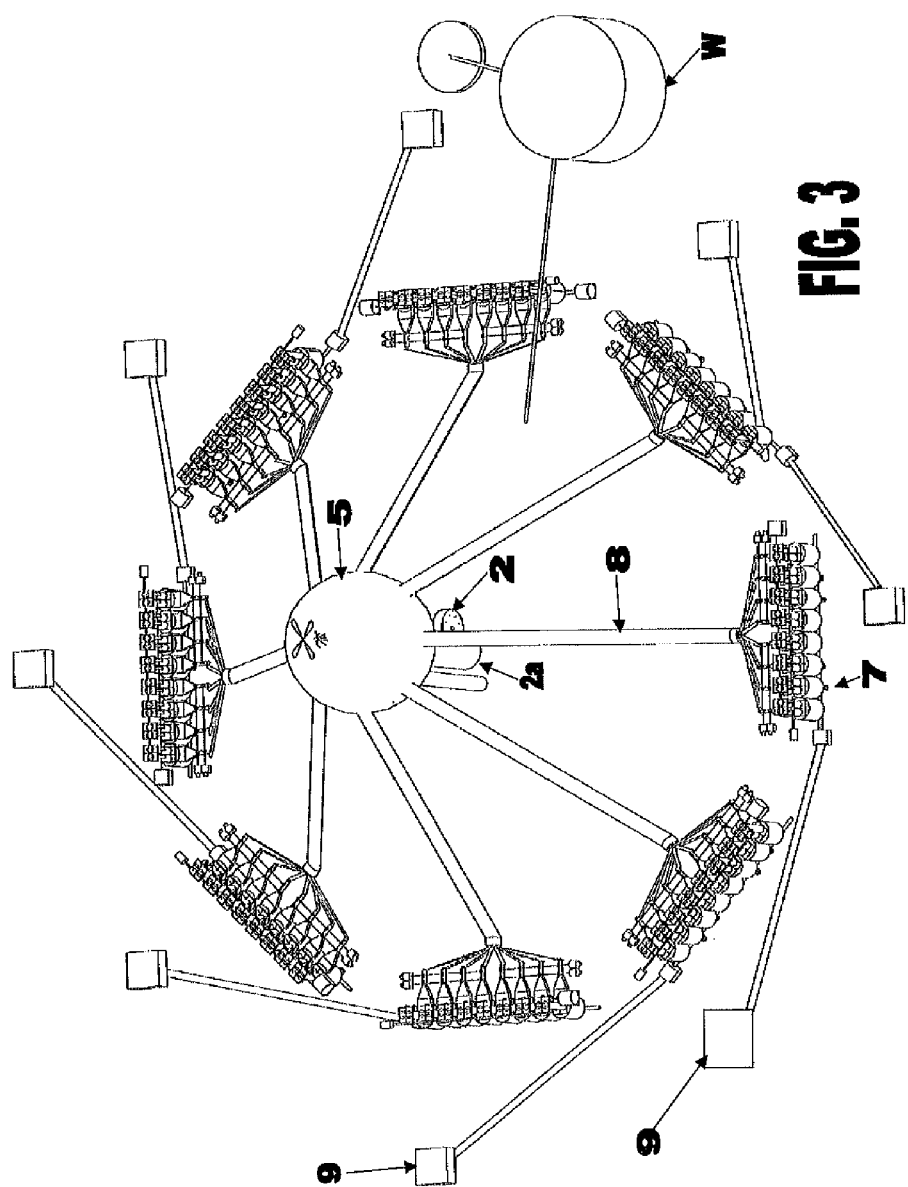
FIG. 3 is a top view of the present power system.
Figure 4:
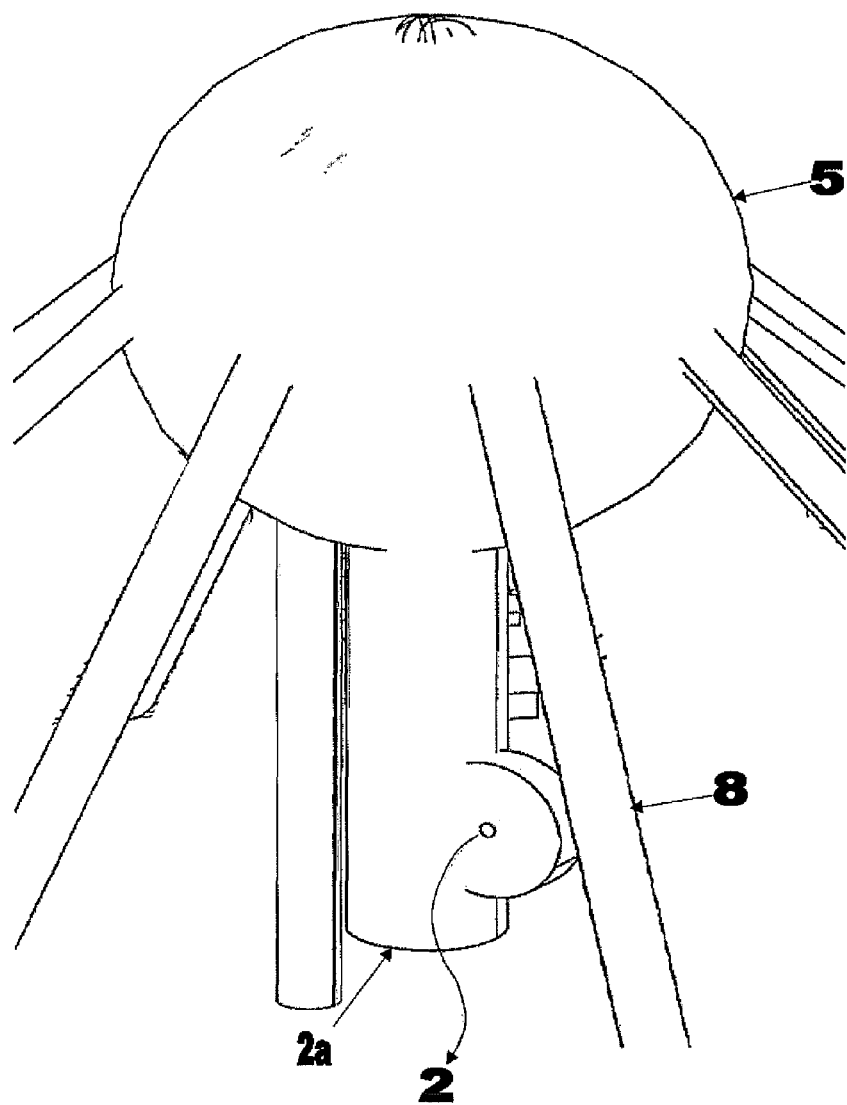
FIG. 4 is a view of the storage system part of the power system.
Figure 5:
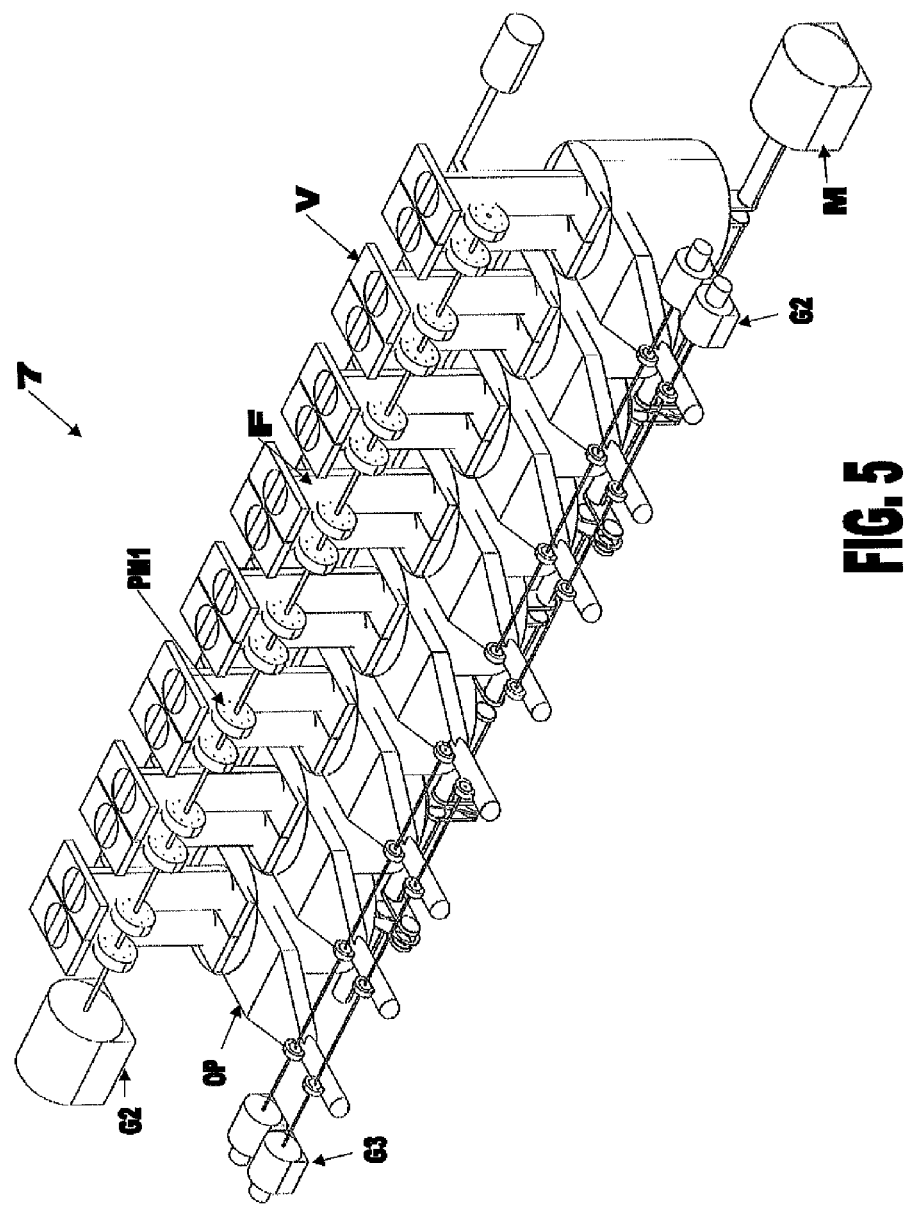
FIG. 5 is an isometric front view of the pump system.

FIG. 3 shows a top view of the present invention wherein the pump system 7 is connected to an external source 9. The power generation system 1 can also incorporate a third container W. It is important to understand that the pump system, as shown might comprise several pumps connected to the first water container 5, wherein the connection between these two parts is through means that facilitates the movement of water from the pump 7 toward the first water container 5. In the instant case the preferred mean to facilitate the water transportation is an inclined channel or pipe 8. FIG. 5 shows inclined pipes 8 connected to the first water container 5, wherein said container 5 is also connected to a prime mover 2 as mentioned before.

Figure 6:
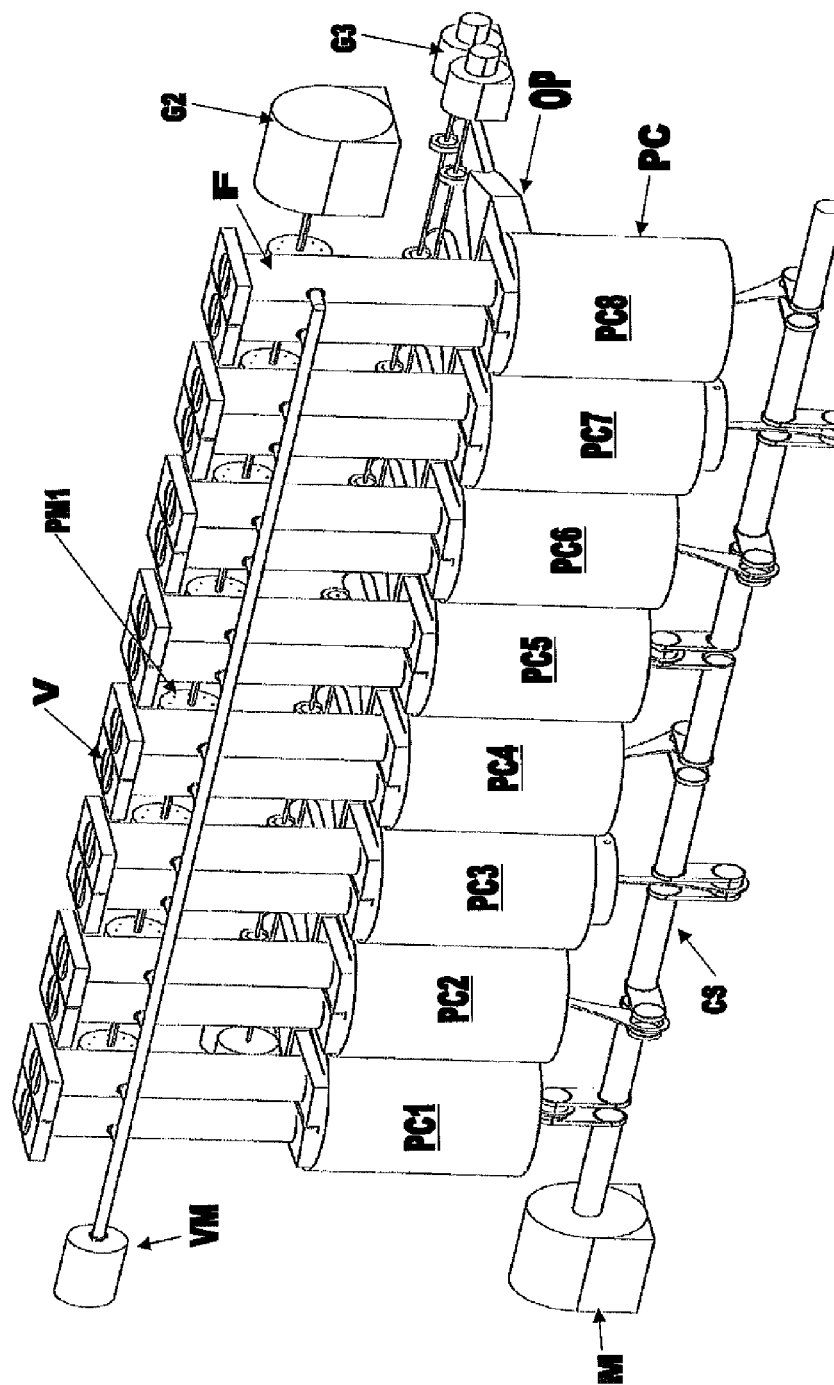
FIG. 6 is an isometric back view of the pump system.

The pump system 7, as shown in FIG. 5, comprises a hydraulic system, as mentioned before, which is in part energized by external energy such as solar panel 9. FIG. 6 show the back part of the pump system 7.

The hydraulic system comprises a valve V, as shown in FIG. 8, which determined water flow entrance at a feeding system F. The feeding system F comprises at least two towers A,B and a first pump generator G2 mechanically connected through a prime mover, wherein said prime mover comprises a water wheel PM1. Since the hydraulic system is located under water at the second container L, when the valve V opens the water on top will descend with enough velocity or power trough the feeding system F allowing a consecutive rotary movement at the PM1 that will transform the hydraulic energy into hydraulic force. The feeding system F also comprises an expulsion pump or vacuum machine VM and is provided with a system feeding valve VF at end connected to a piston cylinder PC. When the feeding system valve VF is open the water enters the piston cylinder PC and move, if needed, the piston P away from the feeding valve VF.

Figure 10:
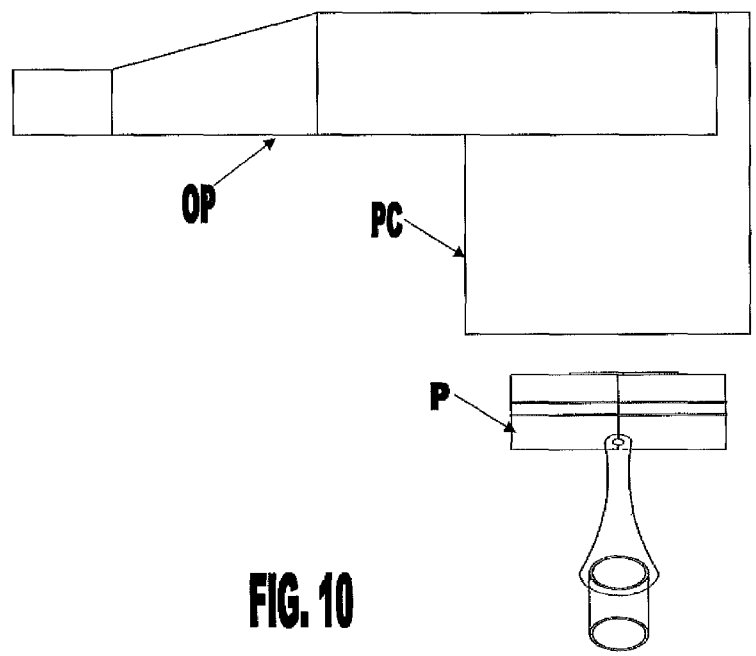
FIG. 10 is a top view of a piston cylinder water exit.
Figure 11:
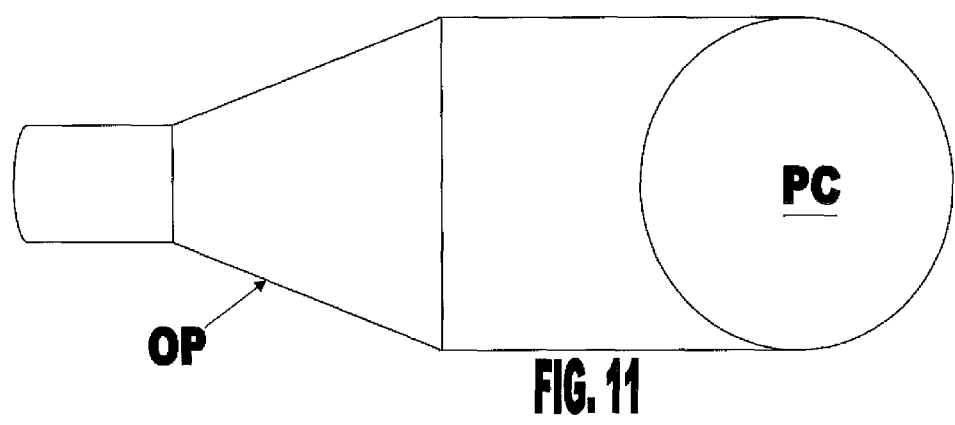
FIG. 11 is a view of the piston cylinder and piston.
Figure 12:
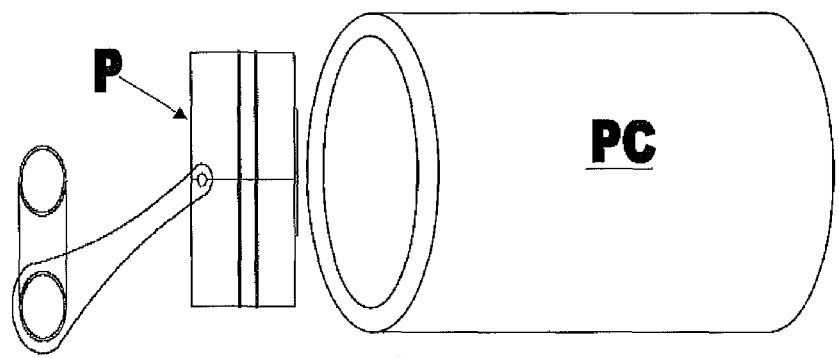
FIG. 12 is show inventions prime mover.
Figure 13:
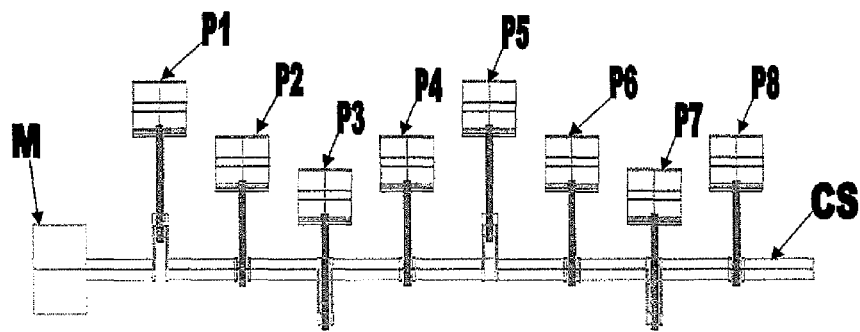
FIG. 13 is a second set of small generators connected to the piston cylinder water exit.
Figure 14:
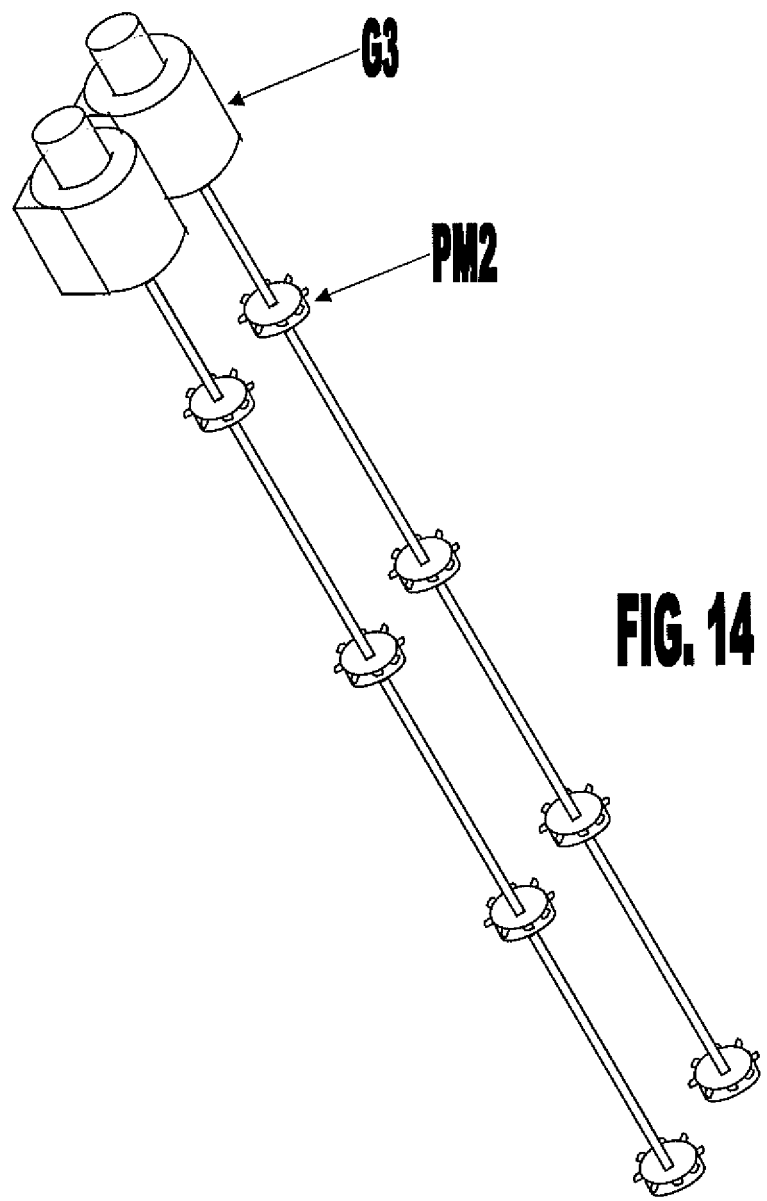
FIG. 14 is a view of the second pump for vacuum at the water drop channels.

FIG. 10 and FIG. 11 shows that the piston cylinder PC also comprises an out port OP, wherein said out port OP also has a valve that let the water inside the piston cylinder PC escape or move toward the first container 5. The piston P, which is basically inserted inside said piston cylinder PC, as shown in FIG. 12, is mechanically connected to a crankshaft CS, as shown in FIG. 13. The crankshaft CS is set in motion not just by the water weight at the piston cylinder PC but also by a motor M. It is important to understand that the motor M is energized principally by the external source 9 but also is energized by several generators (G2, G3) inside the pump system. At the instant case a generator G3 is located at the out port OP taking advantage of the water pumped by the piston P. FIG. 14 shows the connection between several prime movers PM2 to the out port generator G3.

Figure 15:
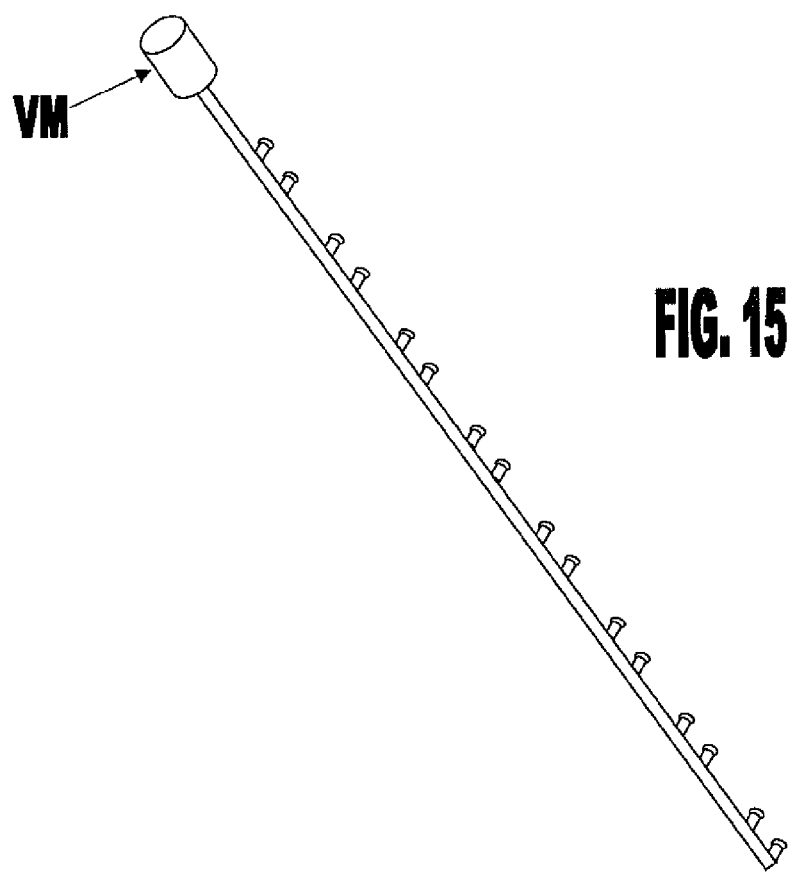
FIG. 15 shows a generator connected to the piston crank shaft.

FIG. 15 shows the vacuum machine or expulsion pump VM, where several pipes connected to a main line are connected to the feeding system F in order to extract all the gases and residual liquids at the feeding pipes. These will assists the water to descend or to fall down with greater velocity, activating the prime mover PM1 at the feeding system F avoiding or preventing pressure to equalize.

All the feature presented, more particularly the valves V,VF,VOP, motor M, vacuum machine VM and generators G2,G3 are controlled by a central control unit CU, as shown in FIGS. 5 and 6, wherein said control unit CU generates control signals after analyzing several elements, such as sensor measures and user preferences.

The control unit CU controls the valves allowing the operation of the hydraulic system 2,3,4 and its crankshaft sequence. First of all, the solar and wind renewable energy would be use to turn on some of the power system 1 features such as valves V,VF,VOP and vacuum machines VM. The vacuum machines VM extracts, if needed, all the gases and liquids from the feeding towers A,B. As mentioned before, the vacuum created assists the water to descend or to fall down with greater velocity, activating the prime mover PM1 which initiates or start the process.

The pump system start working after the vacuum is created, the motor M is energized and the valves V,VF,VOP are checked and ready to be activated. The main purpose of the pump system 7 is to pump water from the second container L to the first container 5 for energy production at the hydropower system 2,3,4.

In the instant case the crankshaft CS comprises several pistons P1-P8, for example eight, inside eight (PC1-PC8) piston cylinders PC, wherein each piston P are place at an different angle or skew in order to maximize the efficiency of a full cycle. The present cyclical displacement of the crankshaft is 0, 90, 180, 270 y 360 a 90, 180, 270. Each Piston cylinder has a feeding tower A,B substantially at a the distal end comprising a preferred sequence.

The preferred sequence for the first tower A is as follows:
The control unit CU confirms all the feeding towers are empty and a vacuum space had been created.
Valves V at piston cylinder PC1 and PC5 opens permitting the entrance of the water.
Prime movers' PM1 feeding system F at the first tower of each piston cylinders PC1 and PC5 starts moving resulting in hydraulic movement on the sequential axle or shaft of the feeding system generator G2.
Valves' VF feeding system F at piston cylinders PC1 and PC5 opens and lets the water moves from the first tower A towards the piston cylinders PC1 and PC5.
Next valves' V tower A at piston cylinder PC4 and PC8 opens permitting the entrance of the water.
Prime movers' PM1 feeding system F at the first tower of each piston cylinder PC4 and PC8 starts moving resulting in hydraulic movement on the sequential axle or shaft of the feeding system generator G2.
Valves' VF feeding system F at piston cylinders PC4 and PC8 opens and lets the water moves from the first tower A towards the piston cylinders PC4 and PC8.
Next valves' V tower A at piston cylinder PC3 and PC7 opens permitting the entrance of the water.
Prime movers' PM1 feeding system F at the first tower of each piston cylinder PC3 and PC7 starts moving resulting in hydraulic movement on the sequential axle or shaft of the feeding system generator G2.

Valves' VF feeding system F at piston cylinders PC3 and PC7 opens and lets the water moves from the first tower A towards the piston cylinders PC3 and PC7.

Next valves' V tower A at piston cylinder PC2 and PC6 opens permitting the entrance of the water.

Prime movers' PM1 feeding system F at the first tower of each piston cylinder PC2 and PC6 starts moving resulting in hydraulic movement on the sequential axle or shaft of the feeding system generator G2.

Valves' VF feeding system F at piston cylinders PC2 and PC6 opens and lets the water moves from the first tower A towards the piston cylinders PC2 and PC6.

Simultaneously with first towers A sequence or with a preferred delay the second tower B sequence is activated. The preferred sequence for the second tower B is as follows:

The control unit CU confirms all the feeding towers are empty and a vacuum space had been created.

Valves V at piston cylinder PC1 and PC5 opens permitting the entrance of the water.

Prime movers' PM1 feeding system F at the second tower of each piston cylinders PC1 and PC5 starts moving resulting in hydraulic movement on the sequential axle or shaft of the feeding system generator G2.

Valves' VF feeding system F at piston cylinders PC1 and PC5 opens and lets the water moves from the second tower B towards the piston cylinders PC1 and PC5.

Next valves' V tower B at piston cylinder PC4 and PC8 opens permitting the entrance of the water.

Prime movers' PM1 feeding system F at the second tower of each piston cylinder PC4 and PC8 starts moving resulting in hydraulic movement on the sequential axle or shaft of the feeding system generator G2.

Valves' VF feeding system F at piston cylinders PC4 and PC8 opens and lets the water moves from the second tower B towards the piston cylinders PC4 and PC8.

Next valves' V tower B at piston cylinder PC3 and PC7 opens permitting the entrance of the water.

Prime movers' PM1 feeding system F at the second tower of each piston cylinder PC3 and PC7 starts moving resulting in hydraulic movement on the sequential axle or shaft of the feeding system generator G2.

Valves' VF feeding system F at piston cylinders PC3 and PC7 opens and lets the water moves from the second tower B towards the piston cylinders PC3 and PC7.

Next valves' V towers B at piston cylinder PC2 and PC6 opens permitting the entrance of the water.

Prime movers' PM1 feeding system F at the second tower of each piston cylinder PC2 and PC6 starts moving resulting in hydraulic movement on the sequential axle or shaft of the feeding system generator G2.

Valves' VF feeding system F at piston cylinders PC2 and PC6 opens and lets the water moves from the second tower B towards the piston cylinders PC2 and PC6.

As mentioned each piston cylinder PC is filled with water coming from a first and second tower A,B. Since the system, as describe, comprises 8 cylinders each piston cylinder PC is filled in pair. For example, as mentioned above, piston cylinder PC1 and PC5 are simultaneously filled in order to maximize the use of water weight and assists the crankshaft CS to pump the water to the first container.

While the water is leaving the piston cylinder PC through the out port OP prime movers PM2, if needed, connected to generator G3 start moving. It is important to understand that the motor M is synchronize with the piston P displacement in order to take advantage of the water weight and efficiently maximize the energy use by this element.

At any giving point or wherein at least enough water is storage at the first container 5 the power system 1 start generating electrical energy for a load 11. As mentioned before, water is directed from the first container 5 to the hydropower system 2. The water used is then drop or directed to the second container L.

While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. For example, maintaining a reserve water tank W to cover the plant needs when necessary.

Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

The invention claimed is:

1. A power generation system comprising:
a first water container,
a hydropower system, wherein said hydropower system is mechanically connected to the first water container,
a second water container, wherein said second container receives water from the hydropower system,
and a pump system, wherein said pump system is powered by external energy in order to maintain a continuous flow of water for the hydropower system,
wherein said pump system comprises at least a hydraulic system, wherein said hydraulic system comprises,
a feeding system, wherein said feeding system comprises at least two towers, a feeding system valve, an expulsion pump and a second prime mover connected to a first pump generator,
several first valves, wherein said first valves allows the flow of water entering said feeding system,
a piston cylinder, wherein said piston cylinder is connected to the feeding system through said feeding system valve and comprises an out port and an out port valve wherein said out port valve allow the water inside the piston cylinder to move toward the first container through pipes, and
a crankshaft mechanically connected through a shaft to a motor, wherein said crankshaft comprises several pistons that are set in motion by water weight and reside inside the piston cylinder.

2. A power generation system as in claim 1, wherein the external power is renewable energy.

3. A power generation system as in claim 1, wherein the hydropower system comprises a prime mover source which uses water weight as the power source and is mechanically connected to a generator in order to provide the necessary motion for electric power generation.

4. A power generation system as in claim 1, wherein said pump system uses water weight at the second container for electric power generation inside the pump system.

5. A power generation system as in claim 1, wherein said out port comprises a third prime mover connected to a second pump generator.

* * * * *